┌─────────────────────────────────────────────────────────────────┐
United States Patent Office  3,696,025
Patented Oct. 3, 1972
└─────────────────────────────────────────────────────────────────┘

3,696,025
CATALYTIC CRACKING BY ADDITION OF TITANIUM TO CATALYST
Donald O. Chessmore, Pleasant Hill, and Joseph Jaffe, Berkeley, Calif., assignors to Chevron Research Company, San Francisco, Calif.
No Drawing. Filed Nov. 9, 1970, Ser. No. 88,230
Int. Cl. C10g *11/04;* B01j *11/68*
U.S. Cl. 208—113                                     3 Claims

ABSTRACT OF THE DISCLOSURE

In a catalytic cracking process wherein hydrocarbons are cracked at an elevated temperature in the presence of cracking catalyst and the cracking catalyst is regenerated by burning coke off the catalyst using oxygen to obtain regenerator effluent gas containing $CO_2$ and CO, a method for increasing the coke burning rate and the $CO_2/CO$ ratio in the regenerator effluent gases which comprises adding titanium or a titanium compound to the cracking catalyst during the catalytic cracking process.

BACKGROUND OF THE INVENTION

The present invention relates to catalytic cracking of hydrocarbons. More particularly, the present invention relates to improved regeneration of catalytic cracking catalyst by adding a metal to the catalytic cracking catalyst during the catalytic cracking process.

The use of inorganic refractory catalysts including siliceous catalysts for cracking hydrocarbons is well known. These catalysts may be used in cracking processes such as fixed bed, moving bed or fluidized bed operations. In moving bed and fluidized bed operations, during the cracking step, the catalyst generally moves in a downwardly direction under the influence of gravity while contacting hydrocarbons which may be in liquid or gas phase, or in both liquid and gas phase. After passing through the cracking zone, the catalyst is regenerated by burning off carbon deposits. Then the catalyst is elevated, or lifted, or otherwise recycled back to the hydrocarbon cracking zone so that it may again descend through the cracking zone. In some instances, deactivated catalyst particles are elevated to a regeneration zone located above the cracking zones and the catalyst flows back to the cracking zone by gravity.

Commercialized catalytic cracking processes include Airlift TCC as developed by Mobil Oil Corporation and described in Petroleum Refiner, vol. 31, No. 8, August 1952, pp. 71–78; Fluid Catalytic Cracking as developed by Universal Oil Products Company and discussed in Petroleum Refiner, vol. 30, No. 3, March 1951, pp. 130–136; Fluid Catalytic Cracking as developed by Esso Research and Engineering Company and described in Petroleum Refiner, vol. 35, No. 4, April 1956, pp. 201–205; Fluid Catalytic Cracking, Orthoflow, as developed by the M. W. Kellogg Company and discussed in Hydrocarbon Processing, vol. 42, No. 5, May 1963, pp. 135–140; and Houdriflow Catalytic Cracking as developed by Houdry Process and Chemical Company, Division of Air Products and Chemicals, Inc., and described in Ashwill et al., "Commercial Operations Over HZ-1 Cracking Catalyst," A.P.I. meeting, Houston (1966).

Reserach on catalysts is concentrated on the production of new catalysts and improved methods for making and using known catalysts. New catalysts are desired which have improved physical properties, high equilibrium activity, improved selectivity in providing the valuable products which are made by their use, and improved regeneration properties. Refiners are concerned with the catalyst's physical stability toward attrition and its resistance toward steam and heat deactivation; but a primary concern is with change in product distribution as catalysts become contaminated with metals contained in the hydrocarbon feedstocks.

Thus, one of the most important phases of study in the improvement of catalyst performance is in the area of metals poisoning. Various petroleum stocks have been known to contain at least traces of the following metals: iron, calcium, magnesium, aluminum, vanadium, nickel, copper, manganese, strontium, barium, cobalt, zinc, molybdenum, lead, tin, sodium, potassium, lithium, beryllium, bismuth, germanium, silver, gallium and gold. Most of these metals, when present in a cracking stock, deposit as a nonvolatile compound on the catalyst during the cracking process, so that regeneration of the catalyst to remove coke does not remove these contaminants. Although referred to as "metals," the contaminants may be in the form of free metals or nonvolatile metal compounds.

Of the various metals which are to be found in representative catalytic cracking feedstocks, some, like the alkali metals, only deactivate the catalyst without changing the product distribution; therefore, they might be considered true poisons. Others, such as iron, nickel, vanadium, and copper, markedly alter the character and pattern of the cracking reactions. For instance, it has been shown that the yield of gasoline, based on feed disappearance, dropped from 93 to 82% when the laboratory-measured coke factor of a catalyst rose from 1.0 to 3.0 in commercial cracking of a feed stock containing some highly contaminated feedstocks. This decreased gasoline yield was matched by an increase in gas as well as coke.

Although considerable present work, as described in USP 3,234,119, for example, is directed toward producing pure cracking catalysts free of metallic impurities and providing essentially metal-free feeds to catalytic cracking processes, older references have taught the addition of certain metals during catalytic cracking processes. For example, USP 2,901,419 is directed to improvement of a process wherein a metal or metal containing contaminant is deposited on a cracking catalyst with a concomitant reduction in the normal selectivity of the cracking catalyst, the improvement comprising introducing together with the cracking catalyst into the catalyst zone at least one material selected from the group consisting of metals of the right-hand subgroups of groups I and II of the periodic system and compounds of said metals, whereby the reduction in normal selectivity of the catalyst, concomitant with presence of said contaminants, is decreased, i.e., substantially prevented, and the normal selectivity is maintained. Preferably, the material introduced with catalyst into the catalyst zone is one selected from the group consisting of metals selected from the group consisting of copper, silver, gold, zinc, cadmium, and mercury, and compounds of said metals.

Various compounds have also been combined with catalytic cracking catalysts during manufacture of the cracking catalyst to improve the properties of the cracking catalyst. For example, USP 2,886,513 is directed to employing titanium dioxide together with calcium oxide to obtain a catalytic cracking catalyst which is effective to produce a relatively more olefinic product than other catalytic cracking catalysts. USP 2,480,494 is directed to the use of tin oxide in a calcined bauxite cracking catalyst to achieve a reduced rate of carbon deposition on the cracking catalyst and a prolonged life for the cracking catalyst. USP 2,258,787 is directed to a catalyst with improved ability to convert oil to gasoline which catalyst comprises silica gel promoted by titanium, the catalyst being made by treating said gel with a titanium compound in an acid solution. USP 2,344,911 is directed to another silica gel catalyst manufactured by forming film of a titanium compound on the catalyst so as to obtain an improved cracking catalyst. USP 3,471,410, titled "Incorporation of Zirconia into Fluid Catalyst to Reduce Coke Formation," discloses the use of at least 0.1 percent by weight of an oxide of either zirconium, titanium, or hafnium, preferably zirconium, in a silica-alumina catalytic cracking catalyst matrix to reduce coke formed during the catalytic cracking cycle.

Although catalytic cracking catalysts in the past have contained various metals, usually it has been preferred to exclude trace metals from the catalytic cracking catalyst during operation, as the metals generally reduce the selectivity of the catalytic cracking catalyst, i.e., cause increased coke and hydrogen production.

SUMMARY OF THE INVENTION

According to the present invention, in a catalytic cracking process wherein hydrocarbons are cracked at an elevated temperature in the presence of cracking catalyst and the cracking catalyst is regenerated by burning coke off the catalyst using oxygen to obtain regenerator effluent gas containing $CO_2$ and CO, a method is provided for increasing the coke burning rate and also the $CO_2/CO$ ratio in the regenerator effluent gases which comprises adding titanium or a titanium compound to the cracking catalyst during the catalytic cracking process.

The present invention is based in part on the finding that titanium is particularly effective to increase the $CO_2$ to CO ratio in the effluent gases from the cracking catalyst regenerator with concomitant reduction in the amount of carbon left on the cracking catalyst relative to use of the same catalyst in the cracking operation, but without the titanium addition, and furthermore, on the finding that in adding the titanium during the catalytic cracking operation, there is substantially no decrease in the selectivity of the catalytic cracking catalyst. Thus, the titanium which is added during the catalytic cracking operation has the multiple advantages of increasing the amount of heat released during regeneration by more completely oxidizing carbon to $CO_2$, burning more carbon off of the cracking catalyst, and improving the activity of the cracking catalyst for the cracking reaction following regeneration due to the relatively lower amount of carbon remaining on the cracking catalyst after regeneration. Furthermore, the present invention is based on the finding that contacting the cracking catalyst with titanium, particularly titanium added to the catalyst by contacting the catalyst particles with titanium hydride powder, causes an unexpected increase in the carbon burning rate during regeneration. Increased carbon burning rate results in less carbon left on the catalyst after regeneration and increased activity of the catalyst for cracking hydrocarbons in the catalytic cracking reactor.

As indicated in USP 3,234,119, many metals decrease in selectivity of catalytic cracking catalysts and thus increase the hydrogen and coke made during catalytic cracking. For example, although it is believed that iron raises the $CO_2$ to CO ratio in the effluent gases from a catalytic cracking unit regenerator, iron in most instances, similarly to nickel and vanadium, has been found to increase the amount of coke and hydrogen produced in the catalytic cracking reactor compared to the amount of coke and hydrogen produced in the reactor using the same cracking catalyst but without any added iron, nickel or vanadium compounds.

In addition to titanium, other metals which can be used in the process of the present invention include zirconium and boron and their compounds. However, titanium is strongly preferred and the present invention is based largely on our finding of overall superiority of titanium for use as an added metal during catalytic cracking to increase the $CO_2$ to CO ratio in the regenerator effluent gases.

The titanium can be added as a pure metal or as a compound and in either powder or slurry form or other forms. However, an important aspect of the preferred embodiment of the present invention is that the titanium must be added during the catalytic cracking process rather than composited with the catalyst during the manufacture of the cracking catalyst. Adding the titanium compound during the catalytic cracking operation as opposed to compositing the titanium with the catalyst during catalyst preparation has been found to result in improved cracking catalyst regeneration compared to the regeneration of a cracking catalyst without added titanium, even though the catalyst composite contained over 1,000 parts per million by weight of titanium before the additional titanium was added to the catalyst. Adding the titanium during the catalytic cracking operation also is advantageous in that a larger degree of control is maintained over the $CO_2$ to CO ratio from the regenerator as the rate and/or amount of titanium added to the cracking catalyst can be varied to vary the $CO_2$ to CO ratio. Also, titanium previously composited with the catalyst can be lost as fines during attrition of the catalyst. Adding the titanium during the catalytic cracking operation allows for maintenance of a desired amount of titanium on the outside or accessible portions of the catalytic cracking catalyst particles.

Thus, it is important in the process of the present invention to add the titanium during the catalytic cracking operation. The titanium or titanium compound may be added to the cracking catalyst as it enters the reactor or during the time the catalytic cracking catalyst is in the cracking reactor, or it may be added as the catalyst leaves the reactor or at other points in the catalytic cracking process cycle between the reactor and regenerator and including during the charging of fresh catalyst to the catalytic cracking unit.

Preferably, the amount of titanium added during the catalytic cracking process is only a relatively small amount, sufficient to achieve between 100 and 10,000 parts per million titanium on the cracking catalyst. Usually, the amount of titanium which is added must be between about 150 and 20,000 parts per million, based on the weight of catalyst in the system, in order to achieve the desired amount of titanium on the cracking catalyst. It is particularly preferred to add between about 500 and 2,000 parts per million titanium or titanium compound, calculated as the pure metal titanium, to the catalytic cracking catalyst during the catalytic cracking process. The parts per million titanium weight are calculated on the basis of weight fraction of the cracking catalyst.

Although according to the preferred embodiment of the present invention, titanium or a titanium compound is added to the outside of a catalytic cracking catalyst during the cracking cycle, titanium or a titanium compound can also be composited with the catalyst or in the catalyst matrix in amounts from about 0.1 weight percent to about 50 weight percent, preferably 1–20 weight percent, to obtain a catalytic cracking catalyst of improved regenerability, in particularly a catalytic cracking catalyst which is more readily regenerated to low carbon levels remaining on the catalyst and which also gives relatively high $CO_2/CO$ ratios compared to a catalytic cracking catalyst without the added titanium. Commonly owned U.S. Pat. 3,401,125 describes methods for preparing a hydroconversion catalyst containing titanium or a titanium compound and the unexpected improvement in regeneration characteristics for the hydroconversion catalyst containing titanium or a titanium compound.

Various cracking catalysts can be used in the improved catalytic cracking process according to the present invention. Thus, suitable cracking catalysts include silica-based catalysts which may contain solid acidic oxide promoters, e.g., alumina, magnesia, etc., with the promoters usually being less than about 35 percent of the catalyst, preferably about 5 to 25 percent. These compositions are in a state of very slight hydration. These materials may also contain small amounts of other material such as nonvolatile oxides, but current practice in catalytic cracking leans more toward the exclusion of foreign materials from the silica-alumina or silica-magnesia hydrate materials.

Other suitable cracking catalysts include aluminum-silicates which are silica-based materials produced either from natural clays by activation or by purely synthetic methods. The activation of natural clays, mostly of the montmorillonite type, is carried out by treatment with dilute acids, which remove excess alumina and oxides of calcium, iron, etc., and thus enrich the content of silica. Not only clays but also other aluminum silicate, such as molecular sieve zeolites, feldspar, etc., are activated for use as suitable cracking catalysts.

The production of synthetic catalysts can be performed for instance (1) by impregnating silica with aluminum salts; (2) by direct combination of precipitated (or gelated) hydrated alumina and silica in appropriate proportions; or (3) by joint precipitation of alumina and silica from an aqueous solution of aluminum and silicon salts. Synthetic catalysts may be produced by combination of hydrated silica with other hydrate bases as, for instance, magnesia, zirconia, etc. The activated or calcined natural or synthetic catalysts must be relatively free of "impurities," mainly alkaline salts and ferric oxide. The presence of these constituents causes sintering of the catalyst surface on regeneration and a drop in catalytic activity. For this reason, the use of synthetic catalysts, which are more uniform and less susceptible to high temperatures in treatment and regeneration, is often preferable.

Preferred operating conditions for use in the process of the present invention include a temperature of between about 800 and 1,300° F. for the regeneration zone. Using the process of the present invention typically results in at least a 10 to 20 percent increase in the $CO_2/CO$ ratio in the regenerator effluent gases. The $CO_2/CO$ ratio can be increased from a range of about 0.5–1.4 to a range of about 1.0–2.0 using the process of the present invention.

EXAMPLE

The data tabulated below in Table I illustrates the advantages obtained in terms of increased coke burn-off and increased $CO_2$ to CO ratio in the effluent gases from the regeneration of a cracking catalyst to which titanium hydride was added at a concentration of about 1,000 and 2,000 parts per million by weight followed by heating the hydride to decompose the hydride. About a 30 percent increase in carbon burning rate was obtained compared to the use of a catalyst which contained titanium in the matrix, but which did not have titanium added to the exterior of the catalyst. Furthermore, the data shows that the added titanium promoter has the advantage of not increasing carbon and hydrogen production during the catalytic cracking portion of the catalytic cracking cycle. Although zirconia increased the $CO_2/CO$ ratio and the carbon burn-off from the coked cracking catalyst, titanium added to the finished catalyst was found to be unexpectedly superior in both utility to increase carbon burning rate and effectiveness to increase the $CO_2/CO$ ratio in the effluent from catalyst regeneration.

The temperature listed in the second row of Table I below is the temperature at which the carbon fouled catalytic cracking catalyst was regenerated. As can be seen from the table, the addition of titanium compound resulted in a substantially lower amount of carbon (0.17 weight percent) left on the catalyst after regeneration at 1,050° F. compared to the amount (0.36 weight percent) left on the catalyst after regeneration when no titanium additive was used.

TABLE I

| | Catalyst additive | | | |
|---|---|---|---|---|
| | None | 1,000 p.p.m., $TiH_2$ | 2,000 p.p.m., $TiH_2$ | 2,000 p.p.m., zirconia |
| Temperature, °F | 1,050 | 1,050 | 1,050 | 1,050 |
| Carbon on catalyst, wt. percent: | | | | |
| Start | 1.05 | 1.05 | .74 | .97 |
| After 10 min | .36 | .17 | .17 | .22 |
| $CO_2/CO$ ratio | 1.4 | 1.7 | 2.2 | 1.9 |

Although various embodiments of the invention have been described, it is to be understood that they are meant to be illustrative only and not limiting. Certain features may be changed without departing from the spirit or scope of the present invention. It is apparent that the present invention has broad application to improved heat release during regeneration of catalytic cracking operations using added metallic compounds, particularly titanium compounds. Accordingly, the invention is not to be construed as limited to the specific embodiments or examples discussed but only as defined in the appended claims or substantial equivalents of the claims.

We claim:

1. In a catalytic cracking process wherein hydrocarbons are cracked at an elevated temperature in the presence of cracking catalyst and the cracking catalyst is regenerated by burning coke off the catalyst using oxygen to obtain regenerator effluent gas containing $CO_2$ and CO, a method for increasing the $CO_2/CO$ ratio in the regenerator effluent gases which comprises adding titanium or a titanium compound to the cracking catalyst during the catalytic cracking process.

2. A process in accordance with claim 1 wherein sufficient titanium or titanium compound is added to the cracking catalyst during the catalytic cracking process to result in between 100 and 10,000 parts per million titanium on the catalytic cracking catalyst.

3. A process in accordance with claim 1 wherein the titanium is added in the form of titanium hydride.

References Cited
UNITED STATES PATENTS
3,471,410  10/1969  Oleck et al. _____ 252—454

DELBERT E. GANTZ, Primary Examiner

G. E. SCHMITKONS, Assistant Examiner

U.S. Cl. X.R.

208—120; 252—416, 417